US006204937B1

(12) United States Patent
Takeda

(10) Patent No.: US 6,204,937 B1
(45) Date of Patent: Mar. 20, 2001

(54) IMAGE READING DEVICE WITH A BUILT-IN SHIELDING DEVICE AND RELATED IMAGE SCANNING METHOD

(75) Inventor: Yoshiyuki Takeda, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/228,860

(22) Filed: Apr. 18, 1994

(30) Foreign Application Priority Data

Apr. 20, 1993 (JP) .................................................. 5-092835
Oct. 1, 1993 (JP) .................................................. 5-246541

(51) Int. Cl.[7] .............................. H04N 1/04; H04N 1/10; H04N 1/191; H04N 1/192; H04N 1/38
(52) U.S. Cl. .......................... 358/475; 358/488; 358/494; 358/496
(58) Field of Search ..................................... 358/401, 406, 358/448, 449, 452, 453, 464, 468, 471, 474, 475, 487, 488, 494, 496, 497; 355/67, 71, 74, 218, 228, 233, 234, 235

(56) References Cited

U.S. PATENT DOCUMENTS 3,936,172 * 2/1976 McVeigh .................................. 355/71
4,775,799 10/1988 Milch et al. .
4,903,078 * 2/1990 Yeo ........................................ 355/228

FOREIGN PATENT DOCUMENTS

| 0218447 | 4/1987 | (EP) | ................................. H04N/1/38 |
| 0416654 | 3/1991 | (EP) | ................................. H04N/1/46 |
| 2462072 | 2/1981 | (FR) . |
| 2066610 | 7/1981 | (GB) . |

* cited by examiner

*Primary Examiner*—Scott A. Rogers

(57) ABSTRACT

An image reading device that detects the edge of the image to be read and masks the areas outside the edge during the read. The image reading device includes a light transmittance modification device in the optical path between the image illumination source and the photoelectric conversion device. During a pre-scan of the image, the position of the edge of the image is stored in a memory unit. During the actual scan of the image to be read, the edge data is fed to the modification device for each position of the scanner. The modification device blocks out those portions of the area being scanned that are outside the image. In this manner, the image is read while the border area is masked.

16 Claims, 8 Drawing Sheets

IMAGE READING DEVICE WITH A BUILT-IN SHIELDING DEVICE AND RELATED IMAGE SCANNING METHOD

BACKGROUND OF THE INVENTION

1. Field of the Invention

The present invention relates to an image reading device that converts light passed through an original image into electrical signals using a photoelectric conversion element, such as a CCD (Charged Coupled Device) camera, and, more particularly, to such an image reading device capable of masking a specified range of the original image.

2. Description of the Related Art

In the aforementioned field, it is known to use devices such as shading sheets to block out unwanted portions of image light being projected from a translucent original, such as a negative or a transparency. Borders and excess image areas are typically blocked out in this manner. Conventionally, such as shown in FIG. 10, several shading sheets are cut so as to block out these unwanted areas when placed on and around the original. The user would then stack the shading sheets on the original before transmitting light therethrough.

Most image reading devices use an original cassette glass for holding the image. An original holding glass is typically placed over top of the original to secure it in place. Light is transmitted through the original and recorded as electrical signals by a photoelectric conversion element, such as a CCD output. Currently, equipment designed to digitize originals must rely on shading sheets to eliminate excess areas. The shading sheets are held between the cassette glass and the holding glass with the image. As the light cannot pass through the shielding, the camera only sees those regions of the image which the user wishes to be recorded.

Each image to be processed in the aforementioned manner requires a different set of shields to achieve the desired results. Even if only the clear borders of each image are masked, there is still a need for multiple shading sheets, one for each size of original to be processed. There is a practical limit to the different types of sheets that can be prepared, thus limiting the user to a defined number of formats and shading schemes. It is also difficult to maintain the full set of shielding sheets due to the inevitable damage and loss of such sheets. As such, there exists a need for an apparatus and a method for masking an area of an original without using light shielding sheets.

SUMMARY OF THE INVENTION

Accordingly, it is an object of the present invention to provide a light shielding device capable of shielding a variable area of an original image.

It is another object of the present invention to provide a light shielding device capable of shielding a portion of an original image based upon pre-defined values.

It is yet another object of the present invention to provide an image reading device having a light shading device capable of shielding areas of an original image based upon pre-defined values.

It is yet a further object of the invention to provide an image reading device capable of determining which areas of an image are to be shielded.

It is yet a further object of the invention to provide an image reading device capable of determining which areas of an original image are to be shielded and then causing those images to be so shielded during the actual scanning of the original image.

Additional objects and advantages of the invention will be set forth in part in the description that follows, and in part, will be obvious from the description, or may be learned by practice of the invention.

The foregoing objects of the present invention are achieved by providing an image reading device that includes a light modification unit that masks regions of an original image based upon values inputted before or during the actual scanning of the image. The above objects of the present invention may also be achieved with an image reading device that includes a light modification unit able to shield regions of an original image based upon values derived by the image reading device during a pre-scan sequence of the original image.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
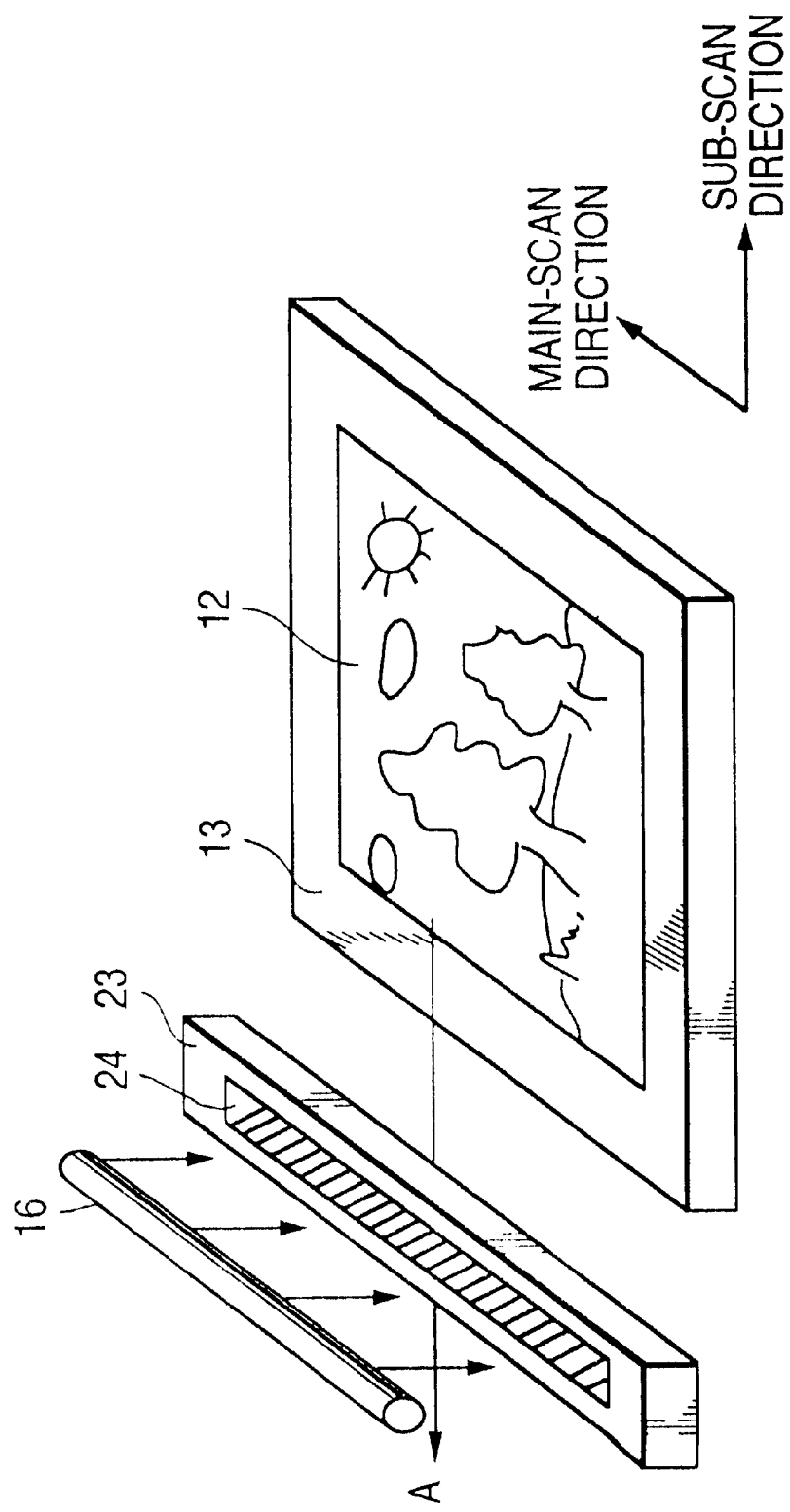
FIG. 1 is an isometric diagram of the light modification apparatus and image holding device for an image reading device according to a preferred embodiment of the invention.

Reference will now be made in detail to the preferred embodiments of the present invention, examples of which are illustrated in the accompanying drawings, wherein like reference numerals refer to like elements throughout.

Figure 2:
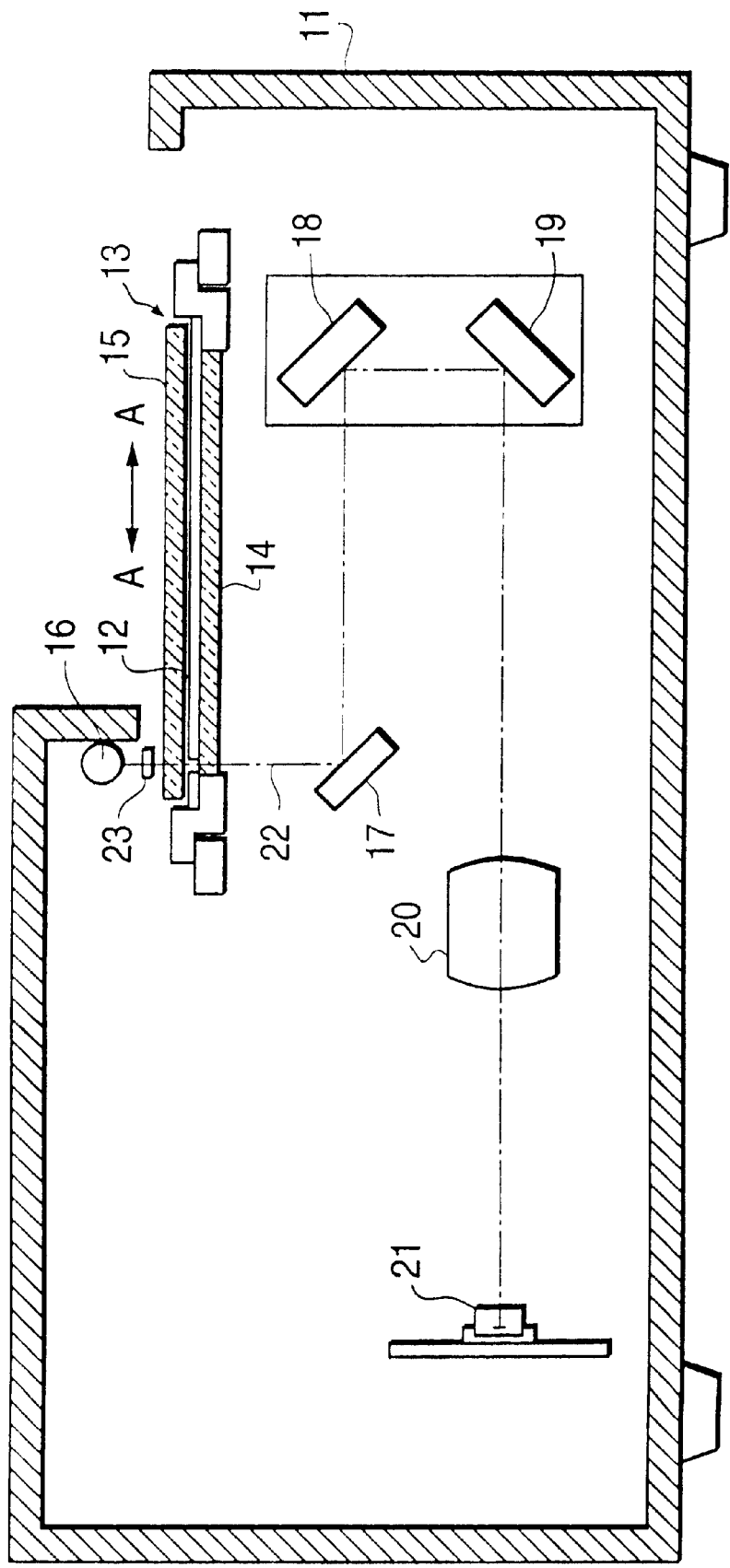
FIG. 2 is a cross-sectional view of an image reading device in accordance with a preferred embodiment of the present invention.

Referring now to FIGS. 1 and 2, wherein shown is a configuration of a first embodiment of an image reading device according to the present invention. As used herein, the term "original" shall refer to the translucent image carrier to be read. Referring to FIG. 2, an original cassette 13, attached to the upper surface of main unit 11, holds the original 12. Original cassette 13 is connected to motor 35 which causes the cassette to move in the direction of the sub-scan indicated by the arrow A—A. The original 12 is held between an original cassette glass 14 and an original holding glass 15. A light source 16 is secured to the main unit 11 above the path of the sub-scan. The light emitted by source 16 is transmitted through original 12, reflected by three reflecting mirrors 17,18,19, and travels through lens system 20 onto CCD 21. CCD 21 receives the image and converts it into electrical signals.

Between light source 16 and cassette 13, on the optical axis 22 uniting light source 16 and reflecting mirror 17, a narrow transparent plate 23 is positioned which spans cassette 13 in a direction perpendicular to the direction of the sub-scan. The narrow transparent plate 23 has two glass plates holding light transmittance element 24 therebetween. Light transmittance element 24 comprises components, such as LCDs and/or electrochromatic elements, in a linear matrix form. The light transmittance of specified portions of transmittance element 24 is controlled by applying a specified voltage to the LCDs or electrochromatic elements. Light is shaded if the transmittance of the elements approaches zero percent.

Figure 3:
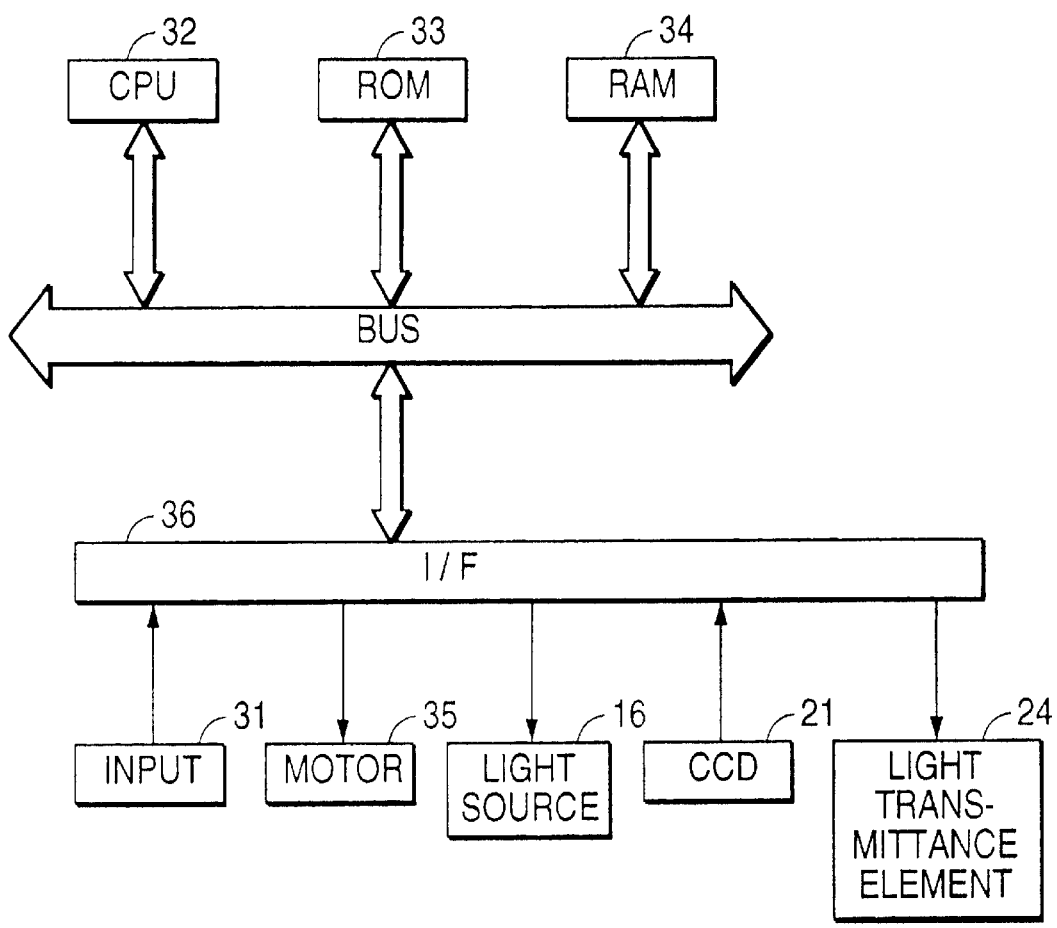
FIG. 3 is a block diagram of the image reading device in accordance with the preferred embodiment of the present invention.

Referring now to FIG. 3, wherein shown is a block diagram of an image reading device according to the preferred embodiment of the present invention, as shown in FIGS. 1 and 2. A CPU 32 controls the various elements of the image reading device according to a program stored in ROM 33. Control includes executing the image reading operation stored in ROM 33. The data necessary for executing the various processing operations is stored, as necessary, in a RAM 34. Input section 31 operates to receive specific commands.

An interface (I/F) 36 outputs signals corresponding to the operation of an input section 31 to CPU 32 through a bus. The data outputted by the CCD 21 is supplied to the CPU 32 through the bus. CPU 32 then typically supplies this data to RAM 34 where it is stored for future operations. In addition, CPU 32 controls the light source 16 through interface 36, causing light to be emitted. Similarly, CPU 32 controls light transmittance element 24 and sets specific elements therein to the desired light transmittance levels. Moreover, CPU 32 drives motor 35 through interface 36 to transport original cassette 13 during the scanning operation.

Figure 4:
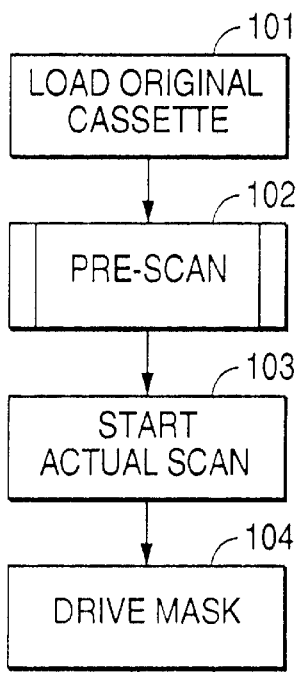
FIG. 4 is a flow chart showing an example of the operation of the image reading device according to the preferred embodiment of the present invention.
Figure 5:
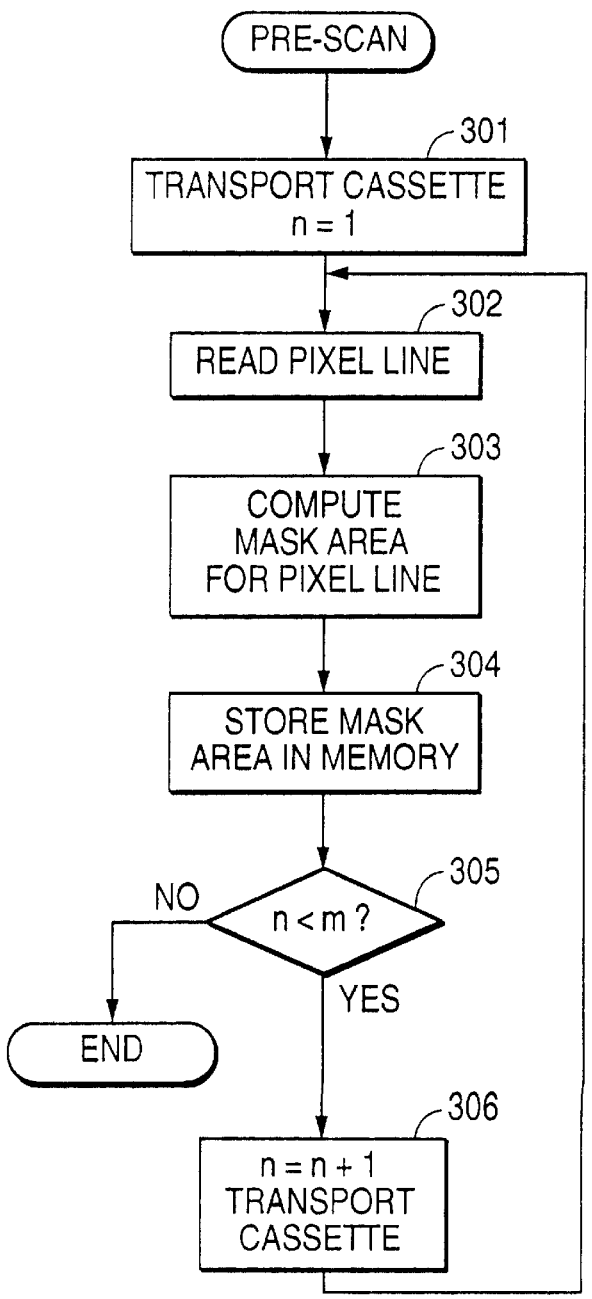
FIG. 5 is a flow chart showing an example of the pre-scan routine performed by the image reading device according to the preferred embodiment of the present invention.

Referring now to FIGS. 4 and 5, therein depicted are flow charts explaining the operation of the image reading device according to the preferred embodiment. First, in step 101, original 12 is set at the desired position on original cassette 13. Next, in step 102, the preliminary scan ("pre-scan") is performed to determine which areas of the image should be masked during the actual scan. The pre-scan is started when input section 31 is operated and a read-start command is given. The CPU 32 then activates light source 16, causing original cassette 13 to be illuminated.

CPU 32 subsequently drives motor 35 to transfer the original cassette in the direction of the sub-scan, as shown by arrow A—A in FIG. 2. Thus, the light emanating from the light source 16 illuminates the original cassette 13, passing through the original 12, and is reflected by reflecting mirrors 17, 18,19 towards lens system 20. Lens system 20 focuses the light and directs it to the CCD 21 for processing.

The details of pre-scan step 102 are shown in FIG. 5. For exemplary purposes, the pre-scan process described below is for the purpose of masking the border of an original. It can be recognized by one skilled in the art that other areas can be selected and masked by changing the selection criteria. First, in step 301, the original cassette is transported such that the first pixel line of the cassette is placed into the read position, i.e., in optical path 22. Next, the variable n, used to indicate the read position, is set to 1. Thereafter, in step 302, the first pixel line is read by CCD 21. The pixel line is read perpendicular to the direction of the sub-scan, in the direction of the main scan. Once the pixel line has been read, the mask range of that line is determined in step 303.

To determine the mask range of the pixel line, the CPU 32 stores the data gathered by the CCD 21 into RAM 34. This stored data is compared with a reference value, set in advance, to obtain the position of the edge of the main scan of original 12. Typically the light that passes through original cassette 13 outside the region occupied by the original 12 is greater in quantity than the light which must also pass through the original 12. Thus, when the reference value is set to a light quantity value between these two, the position of the edge of the original can be detected. The area to be masked can be determined from this edge position.

The position to be masked as determined in step 303 is placed into RAM 34 in step 304.

In the subsequent step 305, the current read line, as indicated by the variable n, is compared to a value m that indicates the last line of the original cassette 13. If n is less than m, n is incremented and the cassette is transported to the next pixel line in step 306. Thereafter, the process repeats from step 302. The image reading device will continue to read subsequent pixel lines and to determine the masking range for each pixel line until the last line is reached, at which point the determination, in step 305, will fail and the pre-scan will end. Through this process, the position of the edge of the original 12 on the original cassette 13 is attained for each pixel line and stored in RAM 34.

After the pre-scan sequence has been completed, the actual scan is initiated in step 103. In preparation for the actual scan, original cassette 13 is returned to the initial position. This time as the cassette is being driven during the actual scan, the light transmittance element 24, attached to transparent plate 23, is driven as a mask according to the data stored in RAM 34. The areas that were determined in step 303 to be masked can be blocked by modifying the transmittance of the elements in light transmittance element 24 to zero percent (or some sufficiently small value). Conversely, those areas that do not need to be masked are controlled such that their light transmittance becomes 100 percent (or sufficiently large value). In this way, the light of the border of original 12 is, in effect, shaded.

Figure 6A:
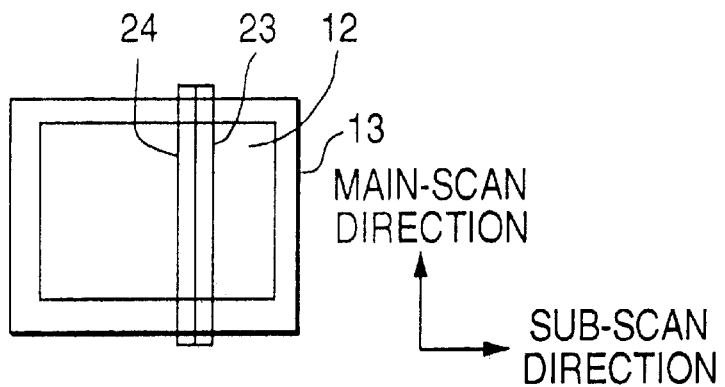
FIG. 6A is a top view of the original image holding apparatus and light modification apparatus of the image reading device according to an embodiment of the present invention.
Figure 6B:
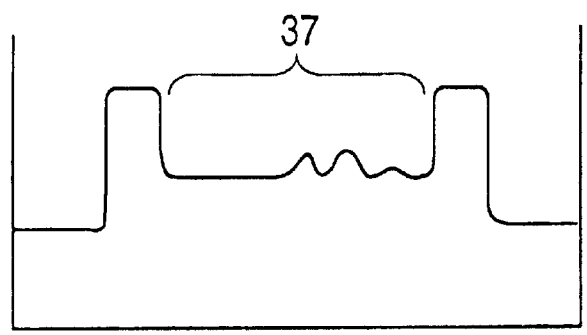
FIGS. 6B and 6C are graphs showing an example output of a CCD in accordance with an embodiment of the present invention.
Figure 6C:
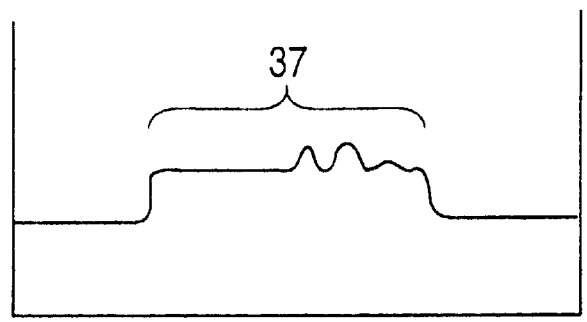

Referring again to FIG. 1, along with transporting the original cassette in the direction indicated by arrow A, voltage is imparted to the elements of the light transmittance element 24 in the mask area determined in step 303. By performing this light shielding for each pixel line lying on the direction of main-scan, along the sub-scan direction, according to the data stored in RAM 34 the specified area of the image of original 12 can be masked. Thus, only the specified area of the image is extracted by CCD 21. FIGS. 6A–C and 7A–C show conceptual examples of CCD's 21 output intensity in relationship to various positions of the original 12 upon the original cassette 13. As shown in FIGS. 6A–C, when the two sides of the original 12 are at right angles to the direction of the sub-scan (see FIG. 6A), the output of the CCD 21 varies during the pre-scan (FIG. 6B). As can be seen, the outside areas of original cassette 13 that are not obstructed by the image of original 12 display a high transmittance of light. In contrast, those areas obscured by the image of original 12 display lesser transmittance values. Area 37 indicates the portion of the image of the original that is to be read by CCD 21. FIG. 6C is representative of the desired output of CCD 21 during the actual scan while light transmittance element 24 is in use. Those areas determined to be outside the image are masked and thus display low transmittance.

Figure 7A:
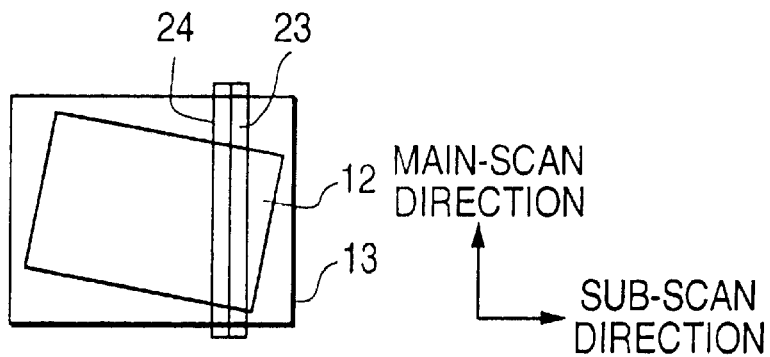
FIG. 7A is a top view of the image holding apparatus and light modification apparatus of an image reading device in accordance with an embodiment of the present invention.
Figure 7B:
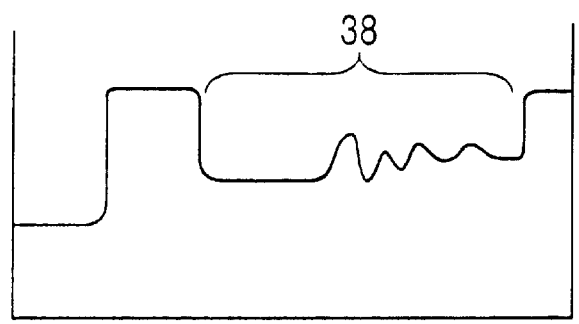
FIGS. 7B and 7C are graphs showing an example of the output of the CCD in accordance with an embodiment of the present invention.
Figure 7C:
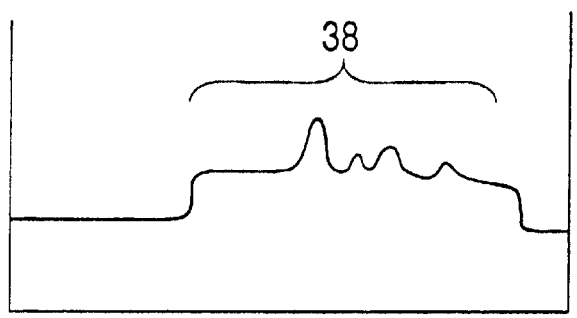

Referring now to FIG. 7A, this figure portrays a situation where an original 12 is skewered on original cassette 13. In this case, the output of the CCD during the pre-scan, FIG. 6B, and actual scan, FIG. 7C, are appropriately skewered to the right.

Where LCDs and other electrochromatic elements are used as the light transmittance element 24, there are instances in which the light emanating from the light source 16 cannot be completely shaded, but if the light can be shaded to a certain extent, the dynamic range of CCD 21 can be concentrated in the read range of the original 12.

Although the first embodiment of the present invention has been described with respect to specific components for the image reading device, it will be recognized that the first embodiment is not limited to those specific components. For example, although the first embodiment has been described with respect to a CCD, it will be recognized that other kinds of image reading devices can be employed. Further, it will be recognized that, while in the above embodiment the optical system (light source 16, light transmittance element 24, reflecting mirror 17, 18, 19, lens system 20 and CCD 21) is stationary while the original cassette 13 is transported through optical axis 22, the optical system could be transported instead of the original cassette. In fact, it is only necessary that the optical system and the original cassette move in relationship to one another.

It will also be recognized by one of ordinary skill in the art that the light transmittance element 24 need not be positioned between original cassette 13 and the light source 16, but rather must only be on the optical path from light source 16 to the CCD 21. It has been found that the position between original cassette 13 and light source 16 offers little deterioration in image quality, but requires that the length of transmittance element 24 be as wide as original cassette 13. On the other hand, if light transmittance element 24 is positioned between the original cassette 13 and the lens system 20, it must only be a length that corresponds to the aperture of lens system 20. While this enables cost reductions, the light from original 12 is typically dampened by the glass plate that forms transparent plate 23, thus deteriorating the quality of the image of original 12.

Figure 8:
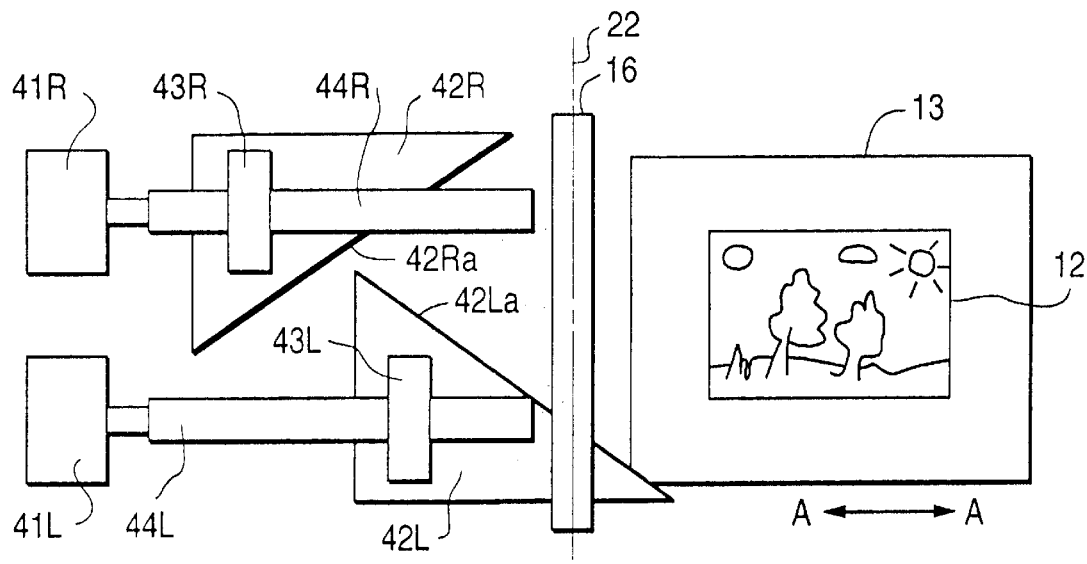
FIG. 8 is a top view of the original image holding apparatus and light shielding apparatus of an image reading device according to another embodiment of the prese invention.
Figure 10:
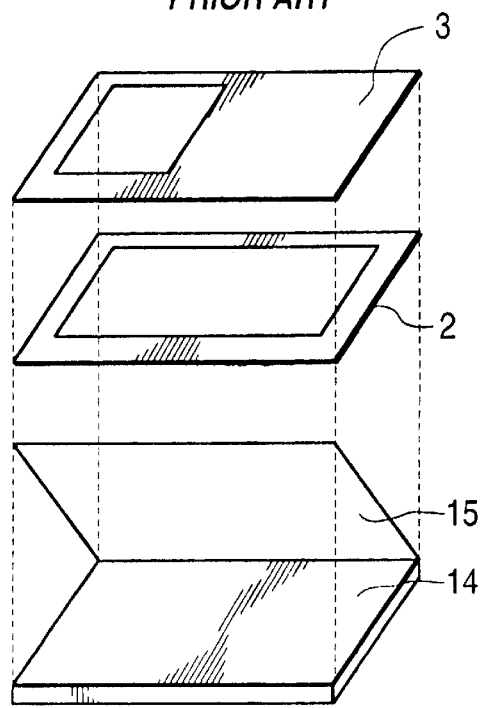
FIG. 10 is an isometric view of a conventional original image holding device and light shielding sheets.

Referring now to FIG. 8, this figure shows a top view of an image reading device according to a second embodiment of the present invention, wherein the light transmittance is controlled by a mechanically operated light shielding plate. Like elements in the figures of the first and second embodiments are referred to by like reference numerals, and a description of the like elements will not be repeated in detail here.

According to the second embodiment of the present invention, the image reading device has light shielding plates 42L and 42R which are positioned to one side of original cassette 13. Nuts 43R and 43L are attached to light shielding plates 42R and 42L, respectively. Nuts 43R and 43L are threaded onto screws 44R and 44L, respectively. The position of light shielding plates 42R and 42L, with respect to original cassette 13 and the pixel line to be scanned, shown by line 22, is controlled respectively by motors 41R and 41L, which rotate corresponding screws 44R and 44L.

Figure 9:
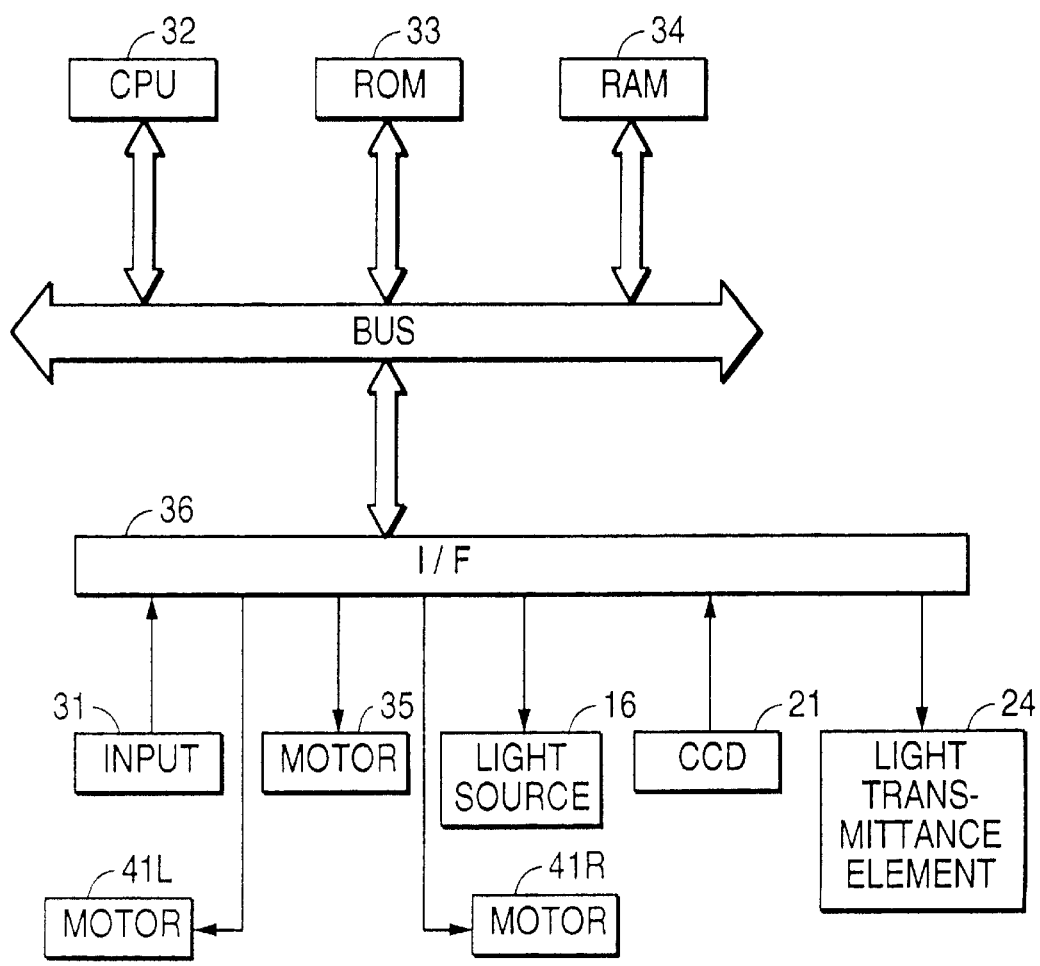
FIG. 9 is a block diagram of an image reading device in accordance with the alternative embodiment of the present invention, as shown in FIG. 9.

FIG. 9 is a block diagram of the electrical configuration for the image reading device according to the second embodiment of the present invention. As can be seen, motors 41L and 41R are connected to interface 36 for control by CPU 32. The rest of the electrical configuration is similar to that of the first embodiment.

When motors 41L and 41R are driven by CPU 32, the screws 44L and 44R are rotated. This rotation acts to lever nuts 43L and 43R in the direction of the sub-scan. Light shielding plates 42L and 42R are formed such that their inner sides 42La and 42Ra are angled with respect to the sub-scan direction. Therefore, the position at which the light from light source 16 is shaded changes as the plates are moved in relationship to pixel scanning line 22. As will be readily apparent, the specified areas of the image of original 12 can be masked in the same way as the case in which light transmittance element 24 was used.

In operation, the main difference between the first embodiment and the second embodiment is that, in the first embodiment, multiple originals can be placed across scan line 22 and still be correctly masked. Due to the mechanical limitations of the second embodiment, only one original can be placed across scan line 22.

Although the second embodiment of the present invention has been described with respect to specific components for the image reading device, it will be recognized that the second embodiment is not limited to those specific components. For example, although the second embodiment has been described with respect to triangular shielding plates, it will be recognized that other shapes may be used. Further, it will be recognized that other mechanisms for driving the shields can be employed.

Although a few preferred embodiments of the present invention have been shown and described, it would be appreciated by those skilled in the art that changes may be made in these embodiments without departing from the principles and spirit of the invention, the scope of which is defined in the claims and their equivalence.

What is claimed is:

1. A shielding device for use in an image reading device for reading a transmitting original, the image reading device having an transparent platform for holding the transmitting original, an illumination source to illuminate the transmitting original, and a linear photoelectric conversion device to read a linear portion of the image of the original at a selected position upon illumination of the original by the illumination source, the shielding device comprising:

a light transmittance modification device positioned in the optical path between the illumination source and the linear photoelectric conversion device, said transmittance modification device being adapted to alter the transmittance of light passing therethrough corresponding to the linear portion of the original being read;

a reading position modification device to modify the position at which the original is read by the conversion device;

a storage unit to retain the reading position of the original read by the conversion device and the position of the edge of the original at the reading position; and a control unit to alter the transmittance of said light transmittance modification device in response to the position of the edge of the original at the reading position retained in the storage unit.

2. The shielding device, as recited in claim 1, further comprising:

the reading position of the original read by said conversion device and the position of the edge of the original for each reading position being stored in said storage unit during a preliminary scan prior to an actual scan; and said control unit alters the light transmittance of said transmittance modification device such that the light transmittance for an area outside the edge of the original is lowered during said actual scan.

3. The shielding device, as recited in claim 2, further comprising:

said reading position modification device being adapted to move the platform.

4. The shielding device, as recited in claim 2, further comprising:

said reading position modification device being adapted to move the illumination source and said light transmittance modification device.

5. The shielding device, as recited in claim 1, further comprising:

said light transmittance modification device being positioned between the platform and the illumination source.

6. The shielding device, as recited in claim 1, wherein said light transmittance modification device is adapted to alter the transmittance of light only in the area being read by the linear photoelectric conversion device, the area being less than the area of the original.

7. An image reading apparatus for reading a translucent original comprising:

a transparent platform adapted to hold the original;

an illumination source to illuminate the original on said platform;

a linear reading device to read the light from the illuminated original along a main scan path, said reading device detecting the light along a linear main-scan path transverse to the sub-scan path; and a transfer device to move one of the original and said linear reading device, along a sub-scan path orthogonal to the main scan path, in relationship to the other of the original and said linear reading device; and a modification device to modify the transmittance of the light at a specified position on the main-scan path in accordance with the relative positions of the original and said linear transfer device, said modification device being positioned in the optical path from said illumination source to said reading device and changing the width of the main-scan direction.

8. An image reading apparatus comprising:

a transparent platform adapted to hold the original;

an illumination source to illuminate the original on said platform;

a linear reading device to read the light from the illuminated original along a main scan path, said reading device detecting the light along a linear main-scan path transverse to the sub-scan path;

a transfer device to move one of the original and said linear reading device, along a sub-scan path orthogonal to the main scan path, in relationship to the other of the original and said linear reading device;

a modification device to modify the transmittance of the light at a specified position on the main-scan path in accordance with the relative positions of the original and said linear transfer device, said modification device being positioned in the optical path from said illumination source to said reading device;

a storage unit to store an edge position of the original along said main-scan path for each specified position along said sub-scan path; and a control unit to control said modification device in response to the contents of said storage unit.

9. An image reading apparatus, as recited in claim 7, further comprising:

said transfer device transferring the original along the sub-scan path prior to the reading of the original to detect the position of the edges of the original on the main-scan path.

10. An image reading apparatus, as recited in claim 7, further comprising:

said modification device being positioned near the original.

11. An image reading apparatus comprising:

a transparent platform adapted to hold the original;

an illumination source to illuminate the original on said platform;

a linear reading device to read the light from the illuminated original along a main scan path, said reading device detecting the light along a linear main-scan path transverse to the sub-scan path:

a transfer device to move one of the original and said linear reading device, along a sub-scan path orthogonal to the main scan path, in relationship to the other of the original and said linear reading device;

a modification device to modify the transmittance of the light at a specified position on the main-scan path in accordance with the relative positions of the original and said linear transfer device, said modification device being positioned in the optical path from said illumination source to said reading device, and said modification device having a plurality of light transmittance elements, said elements adapted to have their light transmittance adjusted independently of the other elements.

12. An image reading apparatus comprising:

a transparent platform adapted to hold the original;

an illumination source to illuminate the original on said platform;

a linear reading device to read the light from the illuminated original along a main scan path, said reading device detecting the light along a linear main-scan path transverse to the sub-scan path;

a transfer device to move one of the original and said linear reading device, along a sub-scan path orthogonal to the main scan path, in relationship to the other of the original and said linear reading device;

a modification device to modify the transmittance of the light at a specified position on the main-scan path in accordance with the relative positions of the original and said linear transfer device, said modification device being positioned in the optical path from said illumination source to said reading device;

said modification device having a light shielding device adapted to shade the light from said illumination device; and a position control device to control the position of said light shielding device.

13. An image reading apparatus, as recited in claim 7, further comprising:
said transfer device being adapted to transfer said platform.

14. An image reading apparatus for reading a translucent original comprising:
a transparent platform adapted to hold the original;
an illumination source to illuminate the original on said platform;
a linear reading device to read the light from the illuminated original along a main scan path, said reading device detecting the light along a linear main-scan path transverse to the sub-scan path;
a transfer device to move one of the original and said linear reading device, along a sub-scan path orthogonal to the main scan path, in relationship to the other of the original and said linear reading device; and
a modification device to modify the transmittance of the light at a specified position on the main-scan path in accordance with the relative positions of the original and said linear transfer device, said modification device being positioned in the optical path from said illumination source to said reading device, wherein said modification device is adapted to alter the transmittance of light only in the area being read by the reading device, the area being less than the area of the original.

15. A method of scanning an original smaller than the area to be scanned comprising:
pre-scanning the original to determine a border of the original;
main-scanning sequential linear portions of the original in a selected direction with a linear photoelectric conversion device; and
masking a linear portion outside the border of the original in accordance with the main-scanning position;
wherein pre-scanning the original comprises
  (a) illuminating a portion of the scanning area;
  (b) scanning the portion of the scanning area;
  (c) determining if the portion of the scanning area contains a part of the original;
  (d) storing a record of the position of the portion of the original and position of any areas in the scanning area outside the original contained in the portion;
  (e) determining whether the entire original has been pre-scanned; and
  (f) if the entire original has not been pre-scanned repeating steps (a) through (f) on a different portion of the scanning area until the entire scanning area has been read; and
wherein masking an area outside the original during scanning the original comprises
  (a) providing a light transmittance modification device adapted to alter the transmittance of light passing therethrough, the modification device being at least as wide as the area to be scanned and at least as long as the portion of the original to be scanned;
  (b) positioning the light transmittance modification device in the optical path of the portion of the original to be read; and
  (c) altering the transmittance of the light using the light transmittance device to approximately 0% in those areas of the scan corresponding to areas outside the original.

16. A method according to claim 15, wherein the step of positioning the light transmittance modification device comprises placing the device between the source of illumination and the original.

* * * * *